UNITED STATES PATENT OFFICE.

LAUREN B. ARNOLD, OF ROCHESTER, NEW YORK.

IMPROVEMENT IN CHEESE-MAKING PROCESSES.

Specification forming part of Letters Patent No. 188,226, dated March 13, 1877; application filed February 20, 1877.

*To all whom it may concern:*

Be it known that I, LAUREN B. ARNOLD, of Rochester, New York, have invented certain Improvements in the Process of Making Cheese, of which the following is a specification:

My invention relates to the manufacture of cheese from skim-milk. It has been known for some years that that peculiar chemical process known as the cheesy fermentation will not readily go on without the presence of fat, and that the larger the proportion of fat in the milk, the more rapidly the cheesy fermentation proceeds. In skim-milk the fat has been in large part removed, and it is necessary in making cheese from it, to render the other conditions upon which the cheesy fermentation depends as favorable as possible, thereby compensating in large measure for the loss of fat. But the presence of fat is not the only essential condition necessary to the production of the soft salvy condition of cheese, usually indicated by the term rich—it also depends upon the extent of the cheesy fermentation—the change which distinguishes cheese from pressed curd. When this change can be carried on to the extent desired, cheese from skim-milk assumes a rich appearance and becomes palatable and digestible.

During that portion of the cheesy fermentation which goes on after pressing, the curd becomes soluble, loses its tenacious structure, and becomes otherwise fitted for use as human food. The exact character of this change, and the time required to produce it, depend largely upon the treatment of the curd in the process of manufacture. In the ordinary skim-cheese heretofore made, the curd cures very slowly and imperfectly.

My invention relates to the treatment of the skim-milk previous to the addition of the rennet to set the curd. And it depends upon this discovery, that, under the proper conditions, the cheesy fermentation or curing of the pressed curd, is hastened, and the quality of the product improved, by agitating or churning the skim-milk previous to the setting of the curd.

The chemical action induced by this treatment is in the nature of a fermentative process. The small amount of fat left in the skim-milk, is rendered more active in the curing of the cheese, which process is sooner completed, and results in a better product, provided the agitation or churning has not been carried so far as to cause the fat to separate from the milk, in which case an unfavorable result is produced. The fat is then less uniformly distributed throughout the liquid, and its activity in promoting the cheesy fermentation both before and after the pressing is reduced.

My invention may be carried into practice in various modes. A convenient way is to agitate the milk, by putting it into a churn and churning it, or to arrange, in connection with the ordinary vat used for setting the curd, one or more sets of rotary paddles or stirrers. These are preferably attached to vertical rods descending from the ceiling, and are given a rotary motion in any convenient manner. They are so contrived as to be removed from the vat when not in use, and by them the milk, after skimming, is given the requisite amount of agitation, as before indicated. If the vat be large, a number of stirrers may be used. I have also accomplished like favorable results by putting a part of the milk into the churn, and agitating it sufficiently by churning. It is not necessary that all the milk should be agitated. My custom has been to agitate about one-third of it. It is necessary, whatever mode of procedure be adopted, to avoid carrying the treatment of the milk by agitation or churning far enough to induce the separation of the fat in any notable degree. The foregoing described process of churning also improves milk which has not been skimmed, making the cheese product ripen much more rapidly, and adding to its soft salvy state.

I claim—

In the process of making cheese from skim-milk, the agitation, by churning or otherwise, of the skim-milk, substantially as and for the purposes set forth.

LAUREN B. ARNOLD.

Witnesses:
M. H. BRIGGS,
GEORGE B. SELDEN.